United States Patent Office 3,440,034
Patented Apr. 22, 1969

3,440,034
DEFOLIANT COMPOSITIONS
Richard E. Fuller, Bellingham, Mass., assignor to Allied Chemical Corporation, New York, N.Y., a corporation of New York
No Drawing. Filed Oct. 22, 1965, Ser. No. 502,522
Int. Cl. A01n *13/00, 5/00*
U.S. Cl. 71—70                    2 Claims

ABSTRACT OF THE DISCLOSURE

An aqueous plant defoliant and fertilizer composition having as the essential active ingredient, a synergistic combination of sodium arsenite and a fertilizer mixture of urea and ammonium nitrate. There is present 4 to 8 parts of arsenite and 30 to 140 parts of nitrogen fertilizer per 100 gallons of defoliant composition.

---

This invention relates to the defoliation of plants. More particularly, it relates to compositions and a method of defoliating plants employing said compositions.

The removal of foliage from such crop plants as the potato, bean, corn, cotton, and legume is a procedure which has many advantages and is a problem with which many agriculturists are presently concerned. Although the defoliation of various plants is desirable when the crop is harvested by hand, since picking becomes easier and more comfortable, defoliation is particularly advantageous when mechanical pickers or harvesters are employed. Defoliated plants are free from leaves which would otherwise clog spindles of mechanical pickers or add to the trash which must be separated from the desired plant portion being harvested. In addition, when leaves are removed, the operator of the mechanical picker has a better view of the plants to be harvested and is thus able to position the picker over the plants more easily.

Another important reason for defoliation of plants particularly in the case of potatoes, is that the causitive organisms of late blight rot are on the foliar portions of the plants and if the plants are not thoroughly dead at digging, the agent will be transferred to the tubers and stored, and cause storage rot. To wait for the plants to die normally after the forced feeding that potatoes receive would carry on into cold weather when harvest would be impossible. The object therefore is to let them grow and accumulate yield as long as possible, then kill quickly and thoroughly, then harvest.

Various commerically available defoliants such as sodium arsenite, magnesium chlorate, pentachlorophenol, cyanamides, etc. suffer from many serious disadvantages and deficiencies. First of all, the best of these is generally only about 80 percent effective and often requires two or more applications to obtain this 80 percent of effectiveness. Still another drawback of certain defoliants is that they leave a deleterious residue on the plant and in the soil. Since it has become common practice of farmers to rotate crops so that no one crop is grown on the same acreage in two successive years, any residue which is harmful to the next year's crop growth must be eliminated.

Sodium arsenite is particularly effective as a defoliant; however, it is normally used at the lowest effective rate. The chief reason for holding down toxicant rates is not so much that buildup of toxicant levels might affect subsequent crop yield performance, but mainly a fear that increased levels of toxicants like arsenic in soils may eventually lead to determinable levels in the tubers which would bring on action to stop use of the only material that works at all well. It is conventoinal to employ about 8 pounds of sodium arsenite mixed with 30–100 gallons of water. The present invention relates to a process whereby low rates of arsenite are made more effective.

It is an object of this invention to provide compositions which are highly useful as defoliants for crop plants.

It is a further object of this invention to provide a method for defoliating crop plants so that the crop plant may be more readily harvested by mechanical means.

Another object is to reduce the amount of sodium arsenite required for defoliating crop plants.

Other objects and advantages of the invention will be obvious from the description hereinafter.

In accordance with this invention, it has been discovered that crop plants, particularly potato plants, may be easily and effectively defoliated by treating the plant, as by spraying, drenching or immersing, with an aqueous solution of a water-soluble arsenite, and a water-soluble nitrogen fertilizer, the proportion of said arsenite to said nitrogen fertilizer being about 4 to 8 parts arsenite to about 30 to 140 parts of fertilizer.

It has been discovered that when compositions containing the above components as active ingredients are applied to plants, there is produced a better kill with reduced rates of toxicant together with a bonus of nitrogen which will furnish nitrogen to the next crop. This is due to a synergistic effect on defoliation which results from the combination of soluble arsenite with the nitrogen fertilizers.

The water-soluble arsenites suitable for use in this invention include metal salts of arsenious acid such as sodium arsenite, potassium arsenite, copper arsenite, etc. Of these, sodium arsenite is preferred.

The water-soluble nitrogen fertilizer may be any of various known fertilizers such as ammonia, ammonium nitrate, urea, etc. Of these, we have found a mixture of ammonium nitrate and urea, commercially available as "Uran," a fertilizer solution manufactured by Allied Chemical Corporation, to be especially effective.

The novel compositions are usually formulated so that they contain from about 4 to about 8 pounds of water-soluble arsenite, and about 30 to 140 parts of nitrogen fertilizer, preferably about 30 to about 70 parts, per 100 gallons of defoliating solution. In a preferred embodiment, the nitrogen fertilizer contains a mixture of about 30 to 70 parts of urea and about 30 to 70 parts of ammonium nitrate in combination with about 4 parts of water-soluble arsenite per 100 gallons of defoliating solution.

The amounts of the various compositions which it will be necessary to use, will, of course, depend upon the degree of defoliation desired, the degree of maturity of the plants, etc. For defoliation where a maximum amount of leaf drop is desired, the compositions will normally be applied at a rate of about 4 to 8 pounds of water-soluble arsenite per acre of plants.

The aqueous compositions may be employed either alone or in admixture with other modifying ingredients such as insecticides or other plant treating agents. They are effective when applied to plants in a direct manner as by spraying, sprinkling, drenching, etc.

In order that those skilled in the art may better understand the practice of the present invention and in what manner it is to be effected, the following example is given embodying typical compositions and their use as defoliants.

EXAMPLE

A mixture containing urea and ammonium nitrate was furnished as "Uran-30," an aqueous solution containing about 42.2% by weight ammonium nitrate and about 32.7% by weight urea, the remainder being water.

Four plots of plants were treated with the compositions listed below which were applied by spraying.

Each plot of potato plants consisted of two rows 72.5 feet long and plots were adjacent to each other. One gallon of sodium arsenite solution used in the test contained 8 pounds sodium arsenite. Four different defoliation treatments were compared as follows:

Plote 1 treatment: Gallons
    Sodium arsenite solution _____ 1
    Water _____ 100
Plot 2 treatment:
    Sodium arsenite solution _____ ½
    Water _____ 100
    "Uran 30" (30 lb. N) _____ 9.2
Plot 3 treatment:
    "Uran 30" (30 lb. N) _____ 9.2
    Water _____ 100
Plot 4 treatment:
    Sodium arsenite solution _____ 1
    Water _____ 100
    "Uran 30" (30 lb. N) _____ 9.2

The four treatments were applied at the rate of approximately 100 gallons per acre. Treatment was made on a warm afternoon. Observations made after 41 hours showed that the plants in plots 2 and 4 were nearly dead and 1 and 3 showed no visible effect. Observations made after 65 hours showed:

Plot 1 _____ Trace of kill.
Plot 2 _____ A good kill.
Plot 3 _____ No kill.
Polt 4 _____ Excellent kill.

The foregoing example illustrates that while 8 pounds of sodium arsenite per se was relatively ineffective and "Uran-30" per se was totally ineffective as a defoliant, there is a true synergistic effect resulting from the combination of arsenite with nitrogen fertilizer whereby as little as 4 pounds of arsenite per 100 gallons of solution may be employed giving superior and unexpected results.

I claim:
1. The method of defoliating potato vines which comprises applying at a rate sufficient to cause defoliation, a synergistic combination of sodium arsenite and a fertilizer mixture consisting of urea and ammonium nitrate, the proportion of said arsenite to said fertilizer mixture being from about 4 to about 8 parts to about 30 to 140 parts of fertilizer.

2. The method of defoliating potato vines which comprises applying a synergistic combination of 4 to 8 pounds sodium arsenite, 30 pounds urea and 40 pounds ammonium nitrate per acre.

References Cited

UNITED STATES PATENTS

| 1,807,078 | 5/1931 | Walker et al. | 167—15 |
| 3,095,298 | 6/1963 | Fisher et al. | 71—69 |
| 3,101,265 | 8/1963 | Smutny et al. | 71—69 |
| 2,658,826 | 11/1953 | Clarke et al. | 71—69 |
| 2,760,854 | 8/1956 | Lande | 71—69 |
| 3,152,879 | 10/1964 | Yale | 71—69 |
| 3,161,494 | 12/1964 | Warner et al. | 71—80 |
| 3,192,031 | 6/1965 | Zaayenga | 117—100 |

FOREIGN PATENTS 500,549    2/1939    England.

OTHER REFERENCES

Ovcharov Chemical Defoliation of Cotton Plants (1957), CA 52, pp. 10480–81 (1958).

McGoldrick et al., Killing Potato Vines, May 1948, CA 43, pp. 1517–1518 (1949).

LEWIS GOTTS, *Primary Examiner.*

G. HOLLRAH, *Assistant Examiner.*

U.S. Cl. X.R.

71—69, 83, 97, 119